Oct. 17, 1950  R. A. SCHNEIDER  2,526,284
NAVIGATIONAL INSTRUMENT
Filed Sept. 12, 1947  4 Sheets-Sheet 1

Inventor
Robert A. Schneider
By Wooster & Davis
Attorneys.

Oct. 17, 1950 R. A. SCHNEIDER 2,526,284
NAVIGATIONAL INSTRUMENT
Filed Sept. 12, 1947 4 Sheets-Sheet 2

Inventor
Robert A. Schneider
Wooster & Davis Attorneys.

Oct. 17, 1950 — R. A. SCHNEIDER — 2,526,284
NAVIGATIONAL INSTRUMENT
Filed Sept. 12, 1947 — 4 Sheets-Sheet 3
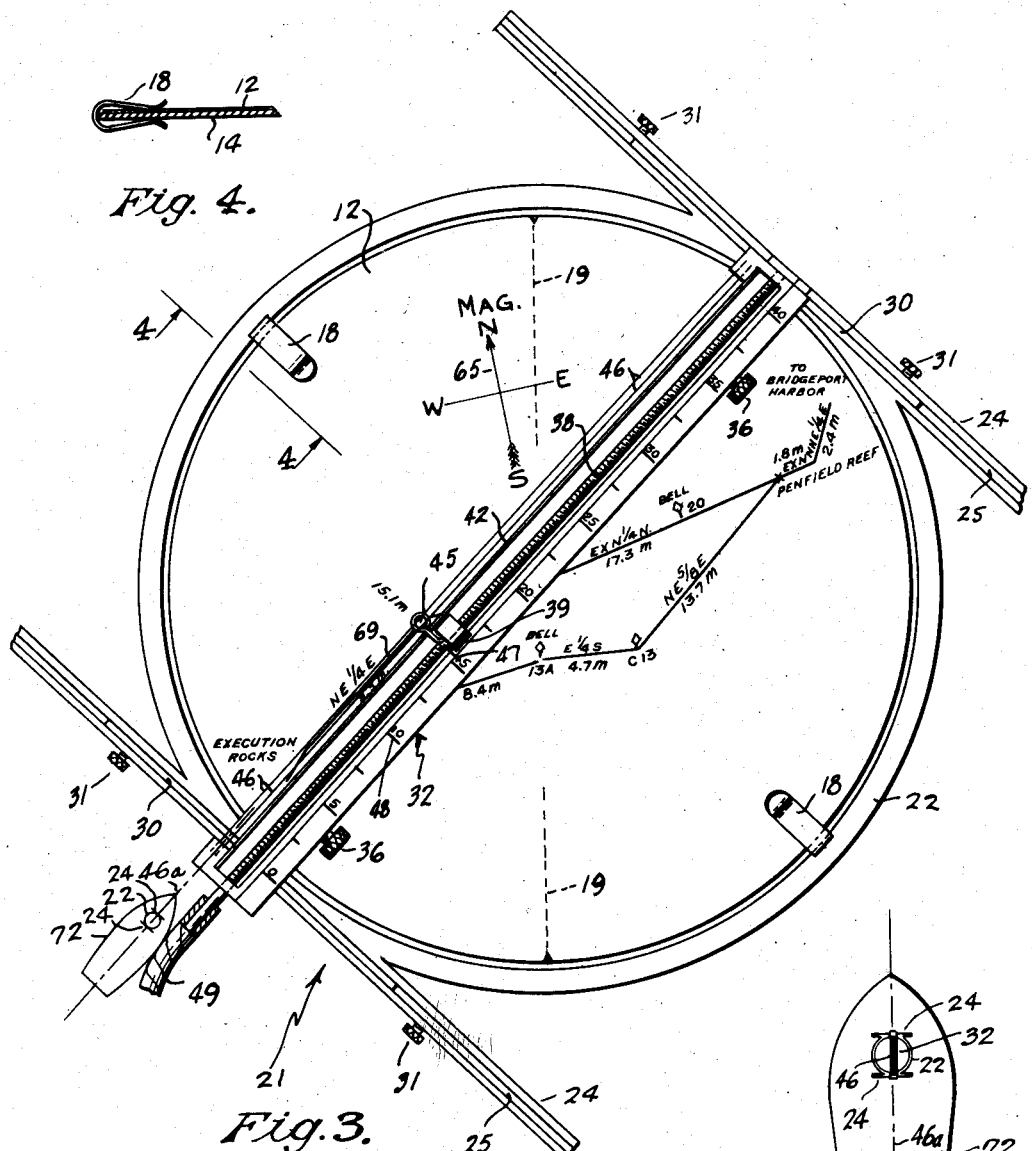
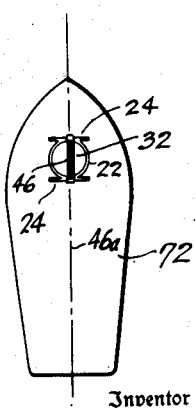
Inventor
Robert A. Schneider
Wooster Davis, Attorneys Oct. 17, 1950     R. A. SCHNEIDER     2,526,284
NAVIGATIONAL INSTRUMENT Filed Sept. 12, 1947     4 Sheets-Sheet 4

Inventor
Robert A. Schneider
By Wooster & Davis, Attorneys.

Patented Oct. 17, 1950

2,526,284

UNITED STATES PATENT OFFICE 2,526,284

NAVIGATIONAL INSTRUMENT

Robert A. Schneider, Bridgeport, Conn.

Application September 12, 1947, Serial No. 773,675

11 Claims. (Cl. 346—8)

This invention relates to a navigational instrument, which may be used for water ships or airships to direct their course, and has for an object to provide an improved device of this character in which the ship, either water or air, may be directed on a complete course from the point of embarkation to its destination by means of a precharted course, and by means following this course moving corresponding to the movements of the ship.

Another object is to provide a device of this character in which a diagram of a precharted course to be followed is always held in the same relation to the earth, and in which means are provided cooperating with the precharted course to direct the course of the ship to follow this course.

A further object is to provide a device of this character in which there is means associated with and movable over the precharted course corresponding to movements of the ship, so as to indicate at all times on the chart the position of the ship.

Another object is to provide means in addition to the above in which a record of the voyage is automatically produced.

With the foregoing and other objects in view, I have devised the construction illustrated in the accompanying drawings forming a part of this specification. It is, however, to be understood the invention is not limited to the specific details of construction and arrangement shown but may embody various changes and modifications within the scope of the invention.

In these drawings:

Fig. 1 is a top plan view of my improved instrument applied to a standard ship's compass, with parts broken away to more clearly show the construction. The device, however, is shown at right angles to the position in which it is ordinarily viewed by the pilot or helmsman when in use, its position with respect to the ship being shown in Fig. 1a;

Fig. 1a is a diagrammatical view showing the position of the device with respect to the ship;

Fig. 3 is a top plan view of the device showing its use in following a precharted course, this view showing the position of the elements at an intermediate point of the trip;

Fig. 4 is a section substantially on line 4—4 of Fig. 3, showing a detail construction;

Figure 1:
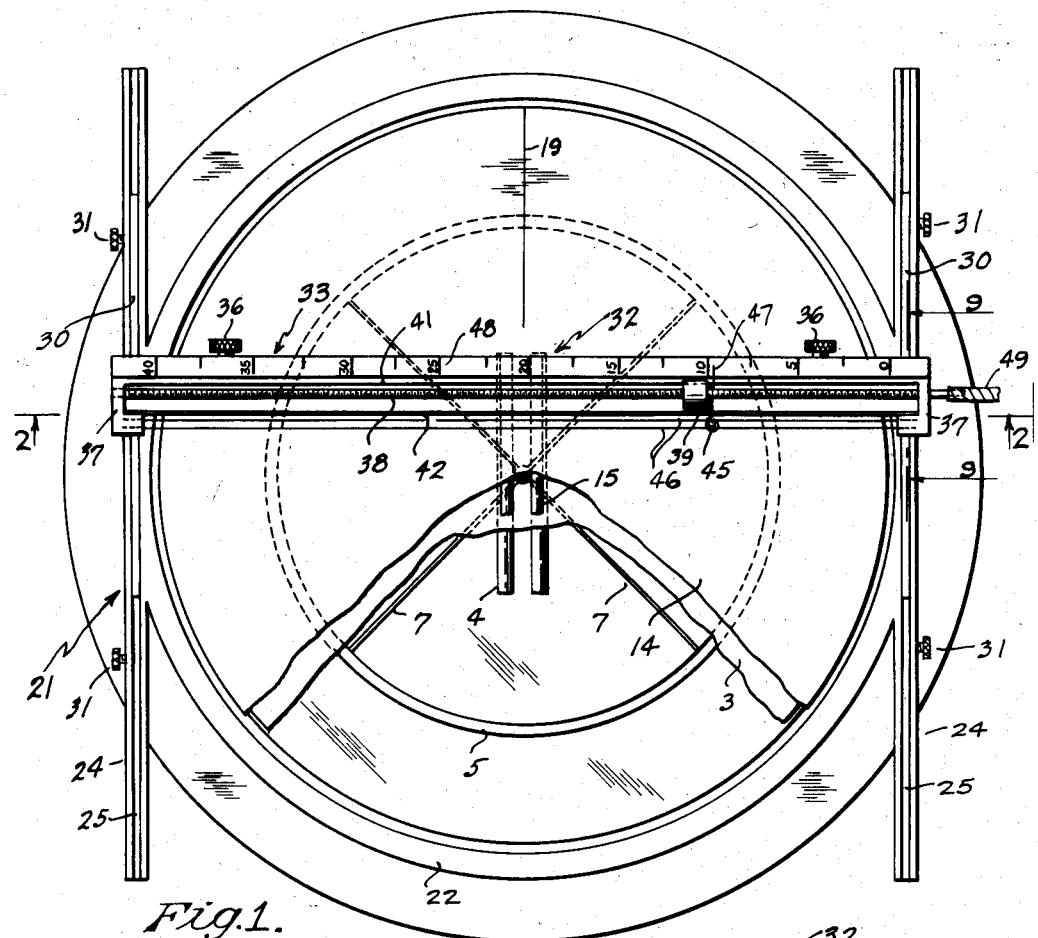
Figure 2:
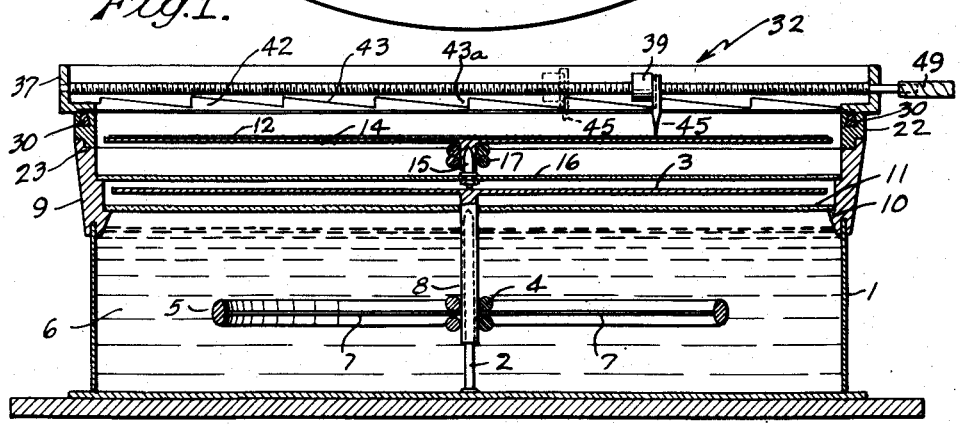
Fig. 2 is a vertical transverse section substantially on line 2—2 of Fig. 1.

The device is shown in Figs. 1 and 2 as applied to and mounted on top of a standard ship's compass, shown somewhat diagrammatically, comprising a compass housing, including a tank 1 and a pivot 2 on which is mounted the compass disc assembly including the compass disc 3, magnets 4, the circular float 5 immersed in the liquid 6 in the tank, and the supports 7 connecting the float with the disc spindle 8. Mounted on the top edges of the sides 1 of the tank is the frame 9 provided with an internal shoulder 10 carrying the glass cover 11. My device includes a circular chart 12 to be used in conjunction with the compass, this being a disc of paper or other suitable material on which the course to be followed is charted, as indicated at 13. This disc when in use may, if desired, be mounted on the disc 3 of the compass, but preferably a separate disc 14 is provided above the compass so as not to interfere with the normal operation of the compass, and this disc is mounted to freely turn on a pivot 15 mounted in a glass plate 16 carried in a frame 9 over compass disc 3, and associated with this disc 14 are compass magnets 17 to maintain this disc 14 and chart 12 at all times in a given relation to the earth by cooperation of these magnets with the earth's magnetic field in the well known manner. The chart disc 12 with the precharted course on its is, when in use, mounted on the disc 14 and held thereon by any suitable means, such, for example, as the spring clamps 18 (Figs. 3 and 4). The disc 14 is provided with a true north and south line 19, or any other designation or lines desired, and the chart disc 12 may be provided with one or more notches 20 in its periphery or other suitable mark or designation, whereby it may be set in true relation to this north and south line.

Mounted on the top of the frame 9 is a protractor 21 comprising a ring 22 seating on the top edge of the frame 9, and preferably rabbeted, as indicated at 23, so as to be accurately held in place, and at diametrically opposite sides of the ring are parallel guide bars 24 provided with dovetail guide grooves 25 in their top walls. Mounted on this protractor is a carriage 26 comprising a substantially L-shaped bar 27 including an upright leg 28 and a horizontal leg 29 supported adjacent its opposite ends on dovetail shaped bars 30 adapted to fit and slide in the guide grooves 25 of the protractor and to slide longitudinally in these guide grooves, and may be held in adjusted position by suitable set screws 31. This protractor is permanently positioned as shown in Fig. 1a with the guides 24 set so they cross the keel of the ship (represented by the line 46a) at right angles or an angle of 90°. This will locate the bar 27 and the lubber's line, represented by the wires 46 carried by the slide 32, parallel to the ship's keel. Thus the carriage 26 is mounted so it may be slid from port to starboard or left to right and vice versa, but this carriage with bar 27 and the lubber's line 46 are always parallel to the ship's keel.

Mounted on the carriage 26 is a slide 32 comprising the elongated body member 33 including the horizontal base 34, and along one edge of this base portion an upright inverted U-shaped portion 35 seating over the upright leg 28 of the carriage 26 on which it may be slid longitudinally of this bar and therefore parallel to the ship's keel, forwardly or backwardly toward the bow or stern of the ship, and held in adjusted position by suitable set screws 36. This member 33 has upright end portions 37 in which is mounted an adjusting screw or worm 38 and on which is a movable carrier comprising a nut 39 having a notch 40 in one side to embrace a longitudinal guide rib 41 on the U-shaped portion 35 of the slide to prevent the nut turning with the screw. The base portion 34 also carries an upright cam plate or bar 42 provided with a series of inclined cams 43 on its upper edge on which rests a pivoted or spring arm 44 on the carrier 39 carrying a recording needle or pointer 45, this pointer being located between a pair of parallel wires 46 indicating the lubber's line, these wires being mounted at the opposite ends of the body member and parallel to the screw 38. These wires 46 are stretched side by side with a narrow space between them. The needle 45 moves in this space. The nut 39 carries a finger or pointer 47 running over a scale 48 on the top of the inverted U-shape portion 35, indicating mileage or other distances as desired.

Figures 10, 11:
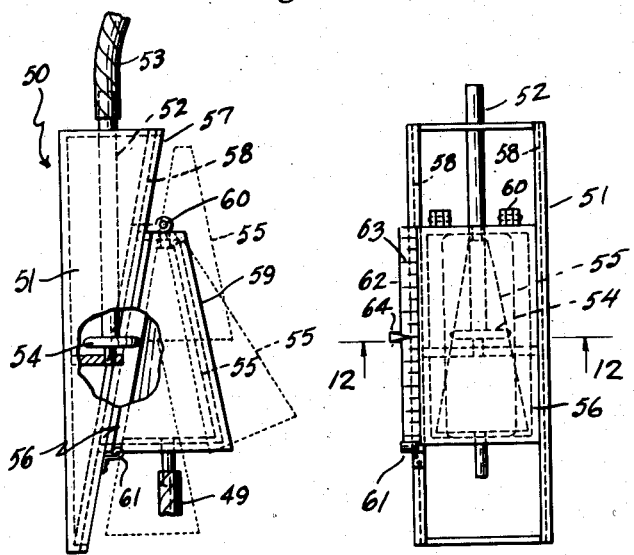
Fig. 10 is a side view of the feed control mechanism for the indicator.
Fig. 11 is a front view thereof.
Figure 12:
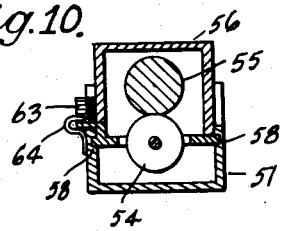
Fig. 12 is a transverse section substantially on line 12—12 of Fig. 11.

The screw or worm 38 is operated in synchronism, or in certain timed relation, with the operation of the propeller shaft or speedometer connected with the propeller shaft, so that the nut 39 is moved to correspond with the movement of the ship. For this purpose, one end of the screw 38 is connected by a suitable flexible shaft 49 to a speed governor 50, shown more clearly in Figs. 10, 11 and 12. This governor comprises a housing 51 mounted on any suitable support or part of the ship (not shown) in which is mounted a drive shaft 52 connected by a flexible or other shaft 53 with the speedometer or propeller shaft (not shown) of the ship, and on the shaft is a drive wheel 54 cooperating with a cone wheel 55 to drive this cone wheel, this cone wheel being connected to the flexible shaft 49 connected to the worm or screw 38. The cone wheel is mounted in a housing 56 mounted for sliding movements in the inclined front edges 57 of the side walls of the housing 51. Any suitable guide means may be provided, but preferably the side walls of the housing are provided with guide grooves 58 in which the opposite edges of the cone wheel housing 56 are mounted and slide, this guide being parallel to the inclined side of the cone shaped wheel, so that as the housing 56 is adjusted, the cone wheel 55 is always maintained in driving contact with the wheel 54. The cone wheel 55 is mounted in a conical shaped section 59 of the housing 56 hinged to the base section by hinge means 60, and normally held in closed position of Fig. 10 by any suitable catch 61. By swinging the lower end of the section 59 outwardly the cone will be shifted away from the drive wheel 54 to arrest driving of the shaft 49 and the nut 39. The cone housing may have a flange 62 along one edge provided with a scale 63 running under a suitable pointer 64 on the housing 51 to indicate adjustment of the cone housing and thus the speed of feed of the nut 39. It will be understood that by adjusting the cone housing 56 and with it the cone wheel 55 with relation to the drive pulley 54, the speed of the shaft 49 may be varied as desired. If the wheel 55 is adjusted downwardly the speed will be increased, and if adjusted upwardly the speed will be decreased.

Operation and use of the device is as follows:

The captain or navigator precharts his desired course on the disc 12. As an example, the course 13, from New York to Bridgeport Harbor, Connecticut, is shown, two optional courses 13a and 13b being drawn. This course as indicated is drawn in straight lines between indicated markings or bearings, giving a compass direction and distance for each section or portion between adjacent markings or bearings. This precharted course is mounted on the disc 14 or the compass disc 3, the disc 14 really being a compass disc because it is held in a given position with relation to the earth by the compass magnets 17. The chart disc 12 is located accurately with respect to the north and south line 19 of the disc 14 corresponding to the north and south lines of the compass, and it will, of course, be understood that during all movements of the ship this disc with the chart will be held in a given and stationary relation with respect to the earth and the true north and south 19 or the magnetic north and south 65.

Figure 5:
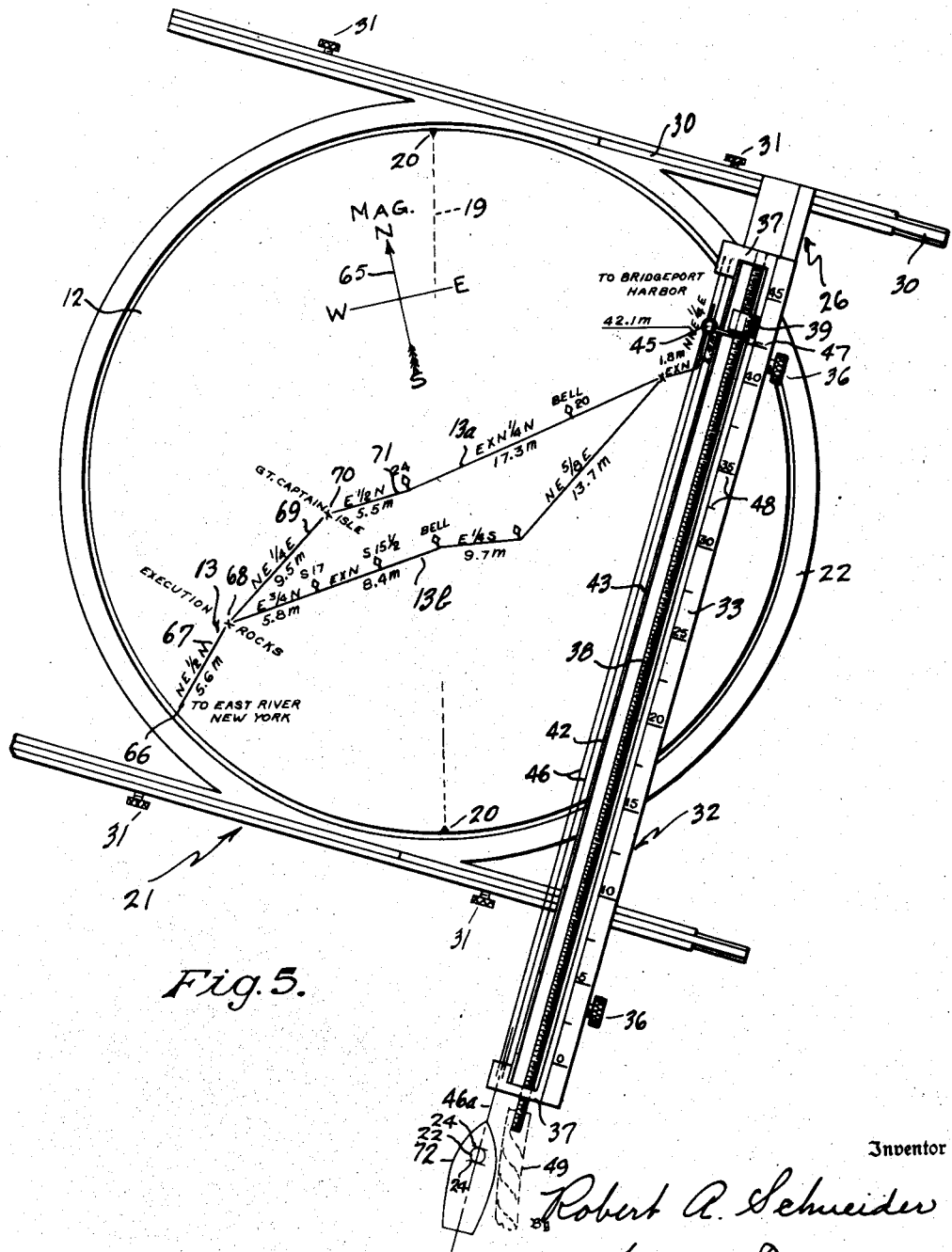
Fig. 5 is a plan view similar to Fig. 3 showing the position of the elements at the finish of the trip.
Figure 6:
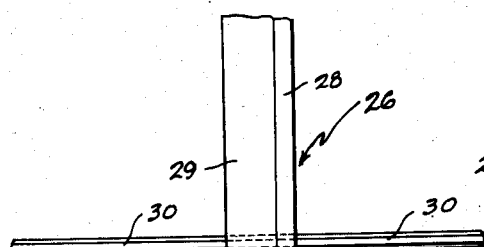
Fig. 6 is a top plan view of one end portion of the carriage.
Figure 7:
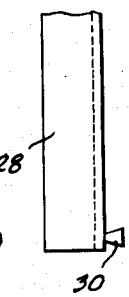
Fig. 7 is a view thereof looking from the right of Fig. 6.
Figure 9:
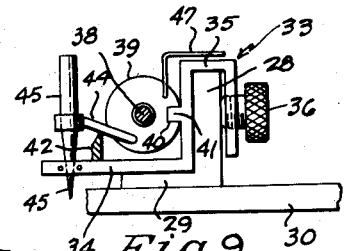
Fig. 9 is a partial section and partial elevation of the slide and indication device, the section being substantially on line 9—9 of Fig. 1.
Figure 8:
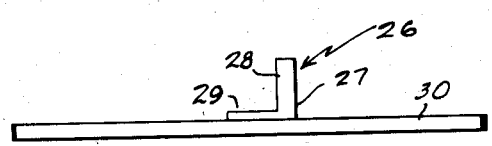
Fig. 8 is a view looking from the bottom of Fig. 6.

At the beginning of the voyage or trip, the captain or pilot, after properly mounting the chart, gets his bearings at the starting point by points on the land or other markings and sets the needle 45 on the starting point of the chart, which in the example shown is the point 66, Fig. 5. This is accomplished by sliding the carriage 26 to the right or left in guides 24 and shifting slide 32 along bar 27. The parts are secured in this position by setting up the set screws. The ship's course is directed so that the wires 46 indicating the lubber's line, which is always parallel to the keel of the ship, are set over and parallel to the first leg 67 of the precharted course, and if that part of the course over which the ship travels at the moment is visible between these two lubber's line wires, the ship is on the right course. The lubber's lines, therefore, is capable of both movements, that is, from port to starboard and bow to stern of ship, and vice versa. The first movement serves to set the lubber's lines directly over the course and resetting when changing course. The second movement serves to set the needle 45 on point of course where the ship actually is located when starting on the trip, and also when changing course. The mileage is recorded on scale 48 of slide 32 by moving finger 47, and will remain the same after resetting needle 45 at the beginning of each new leg of the course. The needle 45 points to the actual geographical position on the map. Then as the ship proceeds, the screw 38 is rotated by its connection with the speedometer or propeller shaft and the nut 39 is slid along the slide at a speed proportional to the speed of the ship, carrying the pointer 45 along and over the section 67 of the charted course, the speed of movement being adjusted according to the speed of the ship and allowing for the effect of water currents by adjusting the cone pulley 55. If the ship is travelling against the currents the needle must travel slower over the charted course as the actual speed of the vessel is reduced, while if the ship is going with the current the speed of the needle must be increased to compensate for the effect of the current. Thus, when any section of the charted course is completed, the needle will have reached the end of a given section of the precharted course simultaneously with the ship's arrival at this point. Also, when the trip or voyage is completed, the needle will have reached the end of the charted course simultaneously with the arrival of the ship in port. The governor (Figs. 10, 11 and 12) can be set for small fractions of a mile, up to four or five miles per hour or more, depending on design. Thus, during the first leg of the voyage the ship travels parallel to and in the direction of the first section 67 of the charted course. When it reaches the point 68 the chart indicates the course is to be changed. When the ship arrives at this point in the actual course, the pointer 45 arrives at this point 68 on the chart. The course of the ship is then shifted to the direction indicated on the section 69, if the course 13a is to be followed, by bringing the lubber's lines 46 over and parallel to this section 69. Then as the ship progresses and the screw 38 is operated proportional to the speed of the ship, the pointer 45 will follow along the section 69 of the course while the ship is moving the distance of 9½ miles, as indicated, until it reaches the point 70. This is the position of the elements shown in Fig. 3. At this point the direction of the course of the ship must be changed to follow along the line 71. This is effected by changing the course of the ship to bring the lubber's line wires 46 over and parallel to the line of the course indicated in section 71. The same procedure is followed for each section of the precharted course until the voyage is completed, the position of the device at the end of the voyage taken as an example being indicated in Fig. 5. After the completion of the voyage and the beginning of a new voyage, the nut 39 and the pointer 45 are shifted back to the beginning or opposite end of the slide by disconnecting the shaft 49 and placing a hand crank (not shown) on the screw 38. Or, if preferred, a split nut 39 could be used or some detachable connection from this nut to the screw could be used, so that at the end of the voyage this connection could be disconnected from the screw, the nut shifted back to the start and then the connection with the screw established. During movements of the nut along the member 32, the pointer 47, travelling over the scale 48, will indicate the distance travelled by the ship.

As the nut 39 travels along under the action of the screw or worm 38, the arm 44 bearing the recording needle or pointer 45 runs along the top edge of the cam strip 42, and because of the cam sections 43 the pointer is normally held above and out of contact with the chart disc 12, thus relieving the drag or friction. However, each time the arm passes over or off the vertical step 43a at the end of the inclined portion of the cam, the pointer will drop and make a mark on the chart, and therefore the record is automatically made of the voyage as the ship proceeds.

In drawing the map or chart, the course should be drawn with all corrections and deviations, with maximum danger spots clearly marked. When this chart is mounted on the device, this precharted course is followed substantially automatically with this mechanism and it is not necessary to consult the compass, as the entire course is designated and followed by means of this device. The ship is steered to set the lubber's line wires 46 over the course indicated on the chart. Therefore, the lubber's line 46a corresponding to the direction of the keel of the ship 72 is on this course. Then as the pointer 45 is at the begining of the section of the course to be followed, it follows along this section drawn on the chart corresponding with the movement of the ship along this section of the course. The ship's direction must be shifted at each point of change, the lubber's line at all times indicating the direction in which the ship is heading. The instrument shows that as the needle moves, the position of the ship with relation to the map changes, and the needle or pointer 45 indicates at all times where the ship is located. The device can be used without a precharted course, but, of course, the starting point must be known and the instrument is set for the direction of travel, and will indicate the distance the ship has travelled on each section, and each time the direction is to be changed the instrument will indicate the direction to be travelled. In this way the position of the ship is always known.

On a conventional compass the lubber's line is fixed, is usually painted into the compass housing, and the ship is steered until the desired degree of the compass rose is in alignment with the lubber's line, thus indicating the direction in which the ship is to move.

In applicant's device and method, the lubber's line is shifted and set over a precharted course which represents that part of the earth over which the ship is to travel. This part of the earth, as represented on the chart, is always held in its true relation with the rest of the earth by the compass disc on which the map or chart with the pre-charted course is mounted. The map or chart on which the course has been drawn is always held in a north and south line, or, that is, in its proper relation to the north and south line, by the compass disc, the line being the line north or magnetic north according to how the map or chart is drawn. Thus the ship travelling over the part of the earth as charted on the map is represented by the needle of the instrument moving over the precharted course, and this needle shows the true geographical position of the ship at all times.

It will be understood from the above the geographical position of the ship will always be known, as well as the distance travelled. Therefore, navigation is possible in a fog or under adverse visibility conditions. The ship can be steered to any port, even by persons unfamiliar with navigation, simply by following the precharted course. An automatic graphical record of the trip is made by the instrument. Although the device has been described and illustrations given for a ship on the water, the device is equally adapted for airships, and may be used for navigation in fog or low visibility. The pilot will not be lost or get off his course if he uses the instrument and follows the precharted course.

Having thus set forth the nature of my invention, I claim:

1. A navigational instrument for ships comprising a protractor to be mounted on a compass and including guides to be located so as to extend transversely of and at right angles to the keel of the ship, a carriage mounted for adjustment in said guides, a slide provided with means for indicating a lubber's line parallel with the keel, means mounting the slide on the carriage for adjustment at right angles to said guides, a carrier mounted on the slide and movable longitudinally thereon, an indicating pointer carried by the carrier adjacent the lubber's line, and means for shifting the carrier along the slide proportionally to the movements of the ship.

2. A navigational instrument for ships comprising a protractor to be mounted on a compass and including guides to be located so as to extend transversely of and at right angles to the keel of the ship, a carriage mounted for adjustment in said guides, a slide provided with means for indicating a lubber's line parallel with said keel, means mounting the slide on the carriage for adjustment at right angles to said guides, a carrier mounted on the slide and movable longitudinally thereon, an indicating pointer carried by the carrier adjacent the lubber's line, means for shifting the carrier along the slide, and driving means for connecting said shifting means with means driven by the ship's propeller shaft to shift the carrier at a speed and distance proportional to movement of the ship.

3. A navigational instrument for ships for use in combination with a compass including a rotatable dial and means for holding it in a given position with respect to the earth, said instrument comprising a chart to be mounted on said dial including a precharted course, a protractor, means for mounting the protractor on the compass, a carriage, means mounting the carriage on the protractor for lateral movement at right angles to the keel of the ship, a slide mounted on the carriage to move at right angles to the movement of the carriage and provided with means for indicating a lubber's line parallel to said keel, a pointer mounted on the slide to move longitudinally thereof over the chart and along the lubber's line, means for shifting the pointer on the slide, and driving means for operating said shifting means proportionally to movements of the ship.

4. A navigational instrument for ships for use in combination with a compass including a rotatable dial and means holding it in a given position with respect to the earth, said instrument comprising a chart to be mounted on the dial including a precharted course, a slide provided with means for indicating a lubber's line parallel with the ship's keel, means for mounting said slide on the compass for adjusting movements transversely of and at right angles to said keel and also parallel thereto, a pointer mounted on the slide to move along the lubber's line, means for shifting said pointer, and driving means for operating said shifting means to shift the pointer proportionally to movements of the ship.

5. A navigational instrument for ships for use in combination with a compass including a rotatable dial and means holding it in a given position with respect to the earth, said instrument comprising a chart to be mounted on said dial including a precharted course, a protractor to be mounted on the compass and provided with laterally extending guides for location at right angles to the keel of the ship, a carriage mounted for sliding movement in said guides and including a supporting bar at right angles to said guides, a slide mounted on said bar to slide longitudinally thereof and provided with means for indicating a lubber's line parallel to the keel, a carrier mounted on said slide, feeding means to shift the carrier along the slide, a pointer carried by the carrier to move over the chart parallel to the lubber's line, and driving means for operating said feeding means proportionally to movements of the ship.

6. A navigational instrument for ships for use in combination with a compass including a rotatable dial and means holding it in a given position with respect to the earth, said instrument comprising a chart to be mounted on said dial including a precharted course, a protractor to be mounted on the compass and provided with laterally extending guides for location at right angles to the keel of the ship, a carrige mounted for sliding movement in said guides and including a supporting bar at right angles to said guides, a slide mounted on said bar to slide longitudinally thereof and provided with means indicating a lubber's line, a carrier mounted on said slide including a nut, an adjusting screw extending longitudinally of the slide and threaded to said nut, a pointer on the nut to follow the precharted course, and a driving connection from the screw to means driven by the ship's propeller shaft to operate the screw proportionally to movements of the ship.

7. A navigational instrument for ships comprising a protractor to be mounted on a compass, guides on the protractor to be located so as to extend transversely at right angles to the keel of the ship, a carriage mounted for adjustment in said guides, a slide, means mounting the slide on the carriage for adjustment at right angles to said guides, means on the slide for indicating a lubber's line parallel to the ship's keel, a carrier mounted on the slide and movable longitudinally of said line, an indicating pointer carried by the carrier adjacent said line, means for shifting the carrier along the slide, and driving means for connecting said shifting means with means driven by the ship's propeller shaft to shift the carrier at a speed and distance proportional to movement of the ship.

8. A navigational instrument for ships comprising a protractor to be mounted on a compass, guides on the protractor to be located so as to extend transversely of and at right angles to the keel of the ship, a carriage mounted for adjustment in said guides, a slide, means mounting the slide on the carriage for adjustment at right angles to said guides, means on the slide for indicating a lubber's line parallel to the keel, a carrier mounted on the slide and movable longitudinally of said line, an indicating pointer carried by the carrier adjacent said line, a screw threaded in the carrier to shift it, and a driving means for connecting said screw with means driven by the propeller of the ship including means for varying the relative speed at which the screw is driven.

9. A navigational instrument for ships comprising a protractor to be mounted on a compass, guides on the protractor to be located so as to extend transversely and at right angles to the ship's keel, a carriage mounted for adjustment in said guides, a slide, means mounting the slide on the carriage for adjustment at right angles to said guides, means on the slide for indicating a lubber's line parallel to said keel, a carrier mounted on the slide and movable longitudinally of said line, an indicating pointer carried by the carrier adjacent said line, means for shifting said carrier to move the pointer along said line, means mounting the pointer on the carrier to permit up and down movement of the pointer, a cam bar on the slide provided with a series of inclined cam surfaces to lift the pointer and permit it to drop at predetermined intervals, and driving means for operating said carrier shifting means proportionally to movements of the ship.

10. A navigational instrument for ships for use in combination with a compass including a rotatable dial and means holding it in a given position with respect to the earth, said instrument comprising a chart to be mounted on said dial including a precharted course, a protractor to be mounted on the compass and provided with laterally extending guides for location at right angles to the keel of the ship, a carriage mounted for sliding movement in said guides and including a supporting bar at right angles to said guides, a slide mounted on said bar to slide longitudinally thereof, a carrier mounted on said slide, means on the slide for indicating a lubber's line, means on the slide for shifting the carrier longitudinally of said line, an indicating pointer carried by the carrier adjacent said line, and driving means for operating the carrier shifting means proportionally to movements of the ship.

11. A navigational instrument for ships for use in combination with a compass including a rotatable dial and means holding it in a given position with respect to the earth, said instrument comprising a chart to be mounted on said dial including a precharter course, a protractor to be mounted on the compass and provided with laterally extending guides for location at right angles to the keel of the ship, a carriage mounted for sliding movement in said guides and including a supporting bar at right angles to said guides, a slide mounted on said bar to slide longitudinally thereof, a carrier mounted on said slide, means on the slide for indicating a lubber's line, a carrier mounted on the slide and movable longitudinally of said line, a recording pointer on the carrier adjacent said line, means mounting the pointer for up and down movements, means for shifting the carrier along the slide, a cam bar provided with a series of inclined cam surfaces cooperating with the pointer mounting means to lift and drop the pointer at predetermined intervals, and means for operating the carrier shifting means proportionally to movements of the ship.

ROBERT A. SCHNEIDER.

REFERENCES CITED

The following references are of record in the file of this patent:

UNITED STATES PATENTS

| Number | Name | Date |
|---|---|---|
| 938,972 | Chance | Nov. 2, 1909 |
| 1,216,201 | Benbow | Feb. 13, 1917 |
| 1,256,430 | Benbow | Feb. 12, 1918 |
| 1,310,200 | Maxim | July 15, 1919 |
| 1,310,201 | Maxim | July 15, 1919 |